United States Patent [19]
Ryan

[11] Patent Number: 6,118,548
[45] Date of Patent: Sep. 12, 2000

[54] REPLACING TRUE BLACK WITH PROCESS BLACK

[75] Inventor: Dennis L. Ryan, Santa Ana, Calif.

[73] Assignee: Canon Kabushiki Kaisha, Tokyo, Japan

[21] Appl. No.: 09/019,313

[22] Filed: Feb. 5, 1998

[51] Int. Cl.[7] .............................. B41B 15/00; G03F 3/08; B41J 2/21

[52] U.S. Cl. ........................ 358/1.9; 358/1.15; 358/1.16; 358/518; 358/523; 347/4.3

[58] Field of Search .................................... 395/109, 114, 395/115, 116, 117; 358/518, 523, 500, 515, 1.9, 1.15, 1.16, 1.17, 1.18, 223; 347/15, 43

[56] References Cited

U.S. PATENT DOCUMENTS

| | | | |
|---|---|---|---|
| 5,168,552 | 12/1992 | Vaughn et al. | 315/109 |
| 5,473,446 | 12/1995 | Perumal, Jr. et al. | 358/523 |
| 5,475,800 | 12/1995 | Vaughn et al. | 395/109 |
| 5,488,398 | 1/1996 | Matsubara et al. | 347/43 |
| 5,500,661 | 3/1996 | Matsubara et al. | 347/41 |
| 5,596,355 | 1/1997 | Koyama et al. | 347/43 |
| 5,633,663 | 5/1997 | Matsubara et al. | 347/41 |
| 5,680,519 | 10/1997 | Neff | 395/109 |

OTHER PUBLICATIONS

M.L. Schmit, "Pentium™ Processor Optimization Tools", Academic Press, Inc., 1995, pp. 103–192.

*Primary Examiner*—Joseph Mancusco
*Assistant Examiner*—Twyler Lamb
*Attorney, Agent, or Firm*—Fitzpatrick, Cella, Harper & Scinto

[57] ABSTRACT

Rapid processing of color print data so as to replace true black ink with process black ink, so as to minimize bleeding between colored regions of a printed document and black regions thereof. To replace black with process black in a raster line, multiple pixels are examined simultaneously in groups so as to determine whether the group contains at least one colored pixel, with the exact location of the colored pixel being obtained thereafter. The last color pixel in the raster line is obtained by inspecting each Nth subsequent pixel, thereby skipping N between inspections, until a first black pixel is encountered, and thereafter backtracking to obtain the first color pixel. Thereafter, all black pixels within a window marked by the first and last color pixels, plus a margin, are replaced with process black.

9 Claims, 7 Drawing Sheets

REPLACING TRUE BLACK WITH PROCESS BLACK

BACKGROUND OF THE INVENTION

1. Field Of The Invention

The present invention relates to data processing of color image data, and particularly relates to data processing of color image data for print out by an ink jet printer such that true black ink is replaced by process black ink, so as to minimize bleeding between colored regions and black regions.

2. Description Of The Related Art

Conventional ink jet printers customarily obtain full color print out through the use of four different inks: three colored inks (such as cyan, magenta and yellow) and a black ink. At the border between a black area print out and a colored area print out, however, one known problem contributes to degraded print out quality: the black ink bleeds into the colored region, thereby degrading the quality of the colored area and blurring the border between the black area and the colored area.

The reason that the black ink bleeds into colored ink areas is that the black ink and the colored inks are of different types. Specifically, the black ink is an evaporation-type pigment ink whereas the colored inks are penetration-type inks. Accordingly, proposals to address the problem of black ink bleeding into colored areas have included a proposal to replace pigment black ink with process black for a few pixels at a black border area. More particularly, for a few black pixels adjacent the border between a black area and a colored area, the black pixels are printed by process black (i.e., superimposingly printing cyan, magenta and yellow), with the remainder of the black area being printed by pigment black ink. Because process black is formed using the same kind of ink as the colored regions, bleeding between the colored region and the black region at the border is minimized. In addition, any bleeding of the pigment black ink into the process black region is not visually detectable because the black ink bleeds into a near black-colored region.

Previous proposals for determining the location of black border regions, and for replacing black ink with process black, are described in Application Ser. No. 08/901,719, "Printer Driver For A Color Printer", and Ser. No. 08/972,308, "Printing With Multiple Different Black Inks", the contents of both of which are incorporated herein by reference as if set forth in full. As described in those applications, print data for a target pixel is examined in a 5×5 pixel grid surrounding the target pixel. If print data for the target pixel indicates that the target pixel is colored, then any black in all surrounding pixels in the 5×5 grid is replaced with process black so as to minimize the adverse effects of black ink bleeding.

While such techniques significantly enhance print quality, they are at the same time computationally-intensive since for every pixel of print information, a surrounding 5×5 grid of pixels must be examined. When black replacement is embodied in a print driver in a personal computer, powered for example by a Pentium™ processor, the number of comparisons needed to process each pixel of print data is so great that implementation of this technique is tediously slow for an average computer user. That is, each comparison, and resulting branch if a black ink replacement becomes necessary, requires a significant number of processor clock cycles. The problem is worsened in processors like the Pentium™ processor which employ dual processor pipelines together with branch prediction. For such processors, there are significant processor cycle penalties making unpredicted branches. See generally Schmit, "Pentium™ Processor Optimization Tools", Academic Press, Inc., 1995, pp. 101 to 192.

Accordingly, although black ink replacement with process black is a desirable feature, it is often omitted because of processor penalties associated with its implementation.

SUMMARY OF THE INVENTION

It is an object of the present invention to address the foregoing situation, by providing a speedy technique for implementing black ink replacement.

Specifically, according to the invention, print data for each pixel is not accessed individually, but rather is accessed in groups so as to determine the location of the first color pixel in each colored region of the print data. Preferably, the color data is arranged in 8-bit bytes, and testing in groups proceeds in double word groups of 32-bits. Thereafter, after location of the first color pixel has been identified, the location of the last color pixel in the colored region is identified. To identify the location of the last color pixel, color data for each and every pixel is preferably not examined; rather, several pixels are skipped between examinations of color data. For example, when testing so as to replace black ink with process black in each grid of M rows by N columns that contains a colored target pixel, N pixels are skipped. Finally, all non-color pixels (i.e., black or white or gray) between the first and the last locations so identified, in each of the M rows, are replaced with process black.

Because the location of the first color pixel proceeds by examining groups of pixels, processor clock cycles are saved because more efficient double-word processing can be utilized. In addition, because the location of the last color pixel is identified by skipping N pixels between pixel examinations, the number of comparison needed to identify the last colored pixels is reduced by a factor of N and all but the last comparison is a predicted branch which minimizes the misprediction penalty. Furthermore, since all non-color pixels between the first and last locations so identified are set to process black, there is no need to make a comparison for each and every pixel to ensure that black ink is replaced with process black in each M×N grid contains a color pixel.

In another aspect the invention outputs cyan (C), magenta (M), yellow (Y), true black (Ka) and process black (Kc) values based on input red (R), green (G) and blue (B) values for each pixel in a print image, in which true black is replaced with process black for all pixels in each M×N region surrounding a target pixel in the event that the target pixel is a color pixel. Three bytes for each pixel are received, with the three bytes respectively representing RGB multi-level values for the pixel. The three RGB bytes are converted to 32-bit CMYK multi-level values for each pixel. Ka and Kc bytes are derived for each pixel, where Ka=0 and Kc=K for a color pixel in which C, M and Y are all not 0, where Ka=Kc=K for a black or gray pixel in which C, M and Y are all 0, and where Ka=Kc=0 for a white pixel in which all of CMY and K are all 0. A flag is derived for each pixel, with the flag preferably sized to one byte, where the flag is set if the pixel is a color pixel and is not set if the pixel is a non-color (i.e., black or white or gray) pixel. Double word testing is performed for all flags in a raster line until encountering a DWORD that contains a flag that is set (thereby indicating a color pixel is somewhere within the four bytes of the DWORD), and thereafter the first color pixel within the DWORD is identified so as to indicate the beginning of a colored region. Each Nth subsequent flag is thereafter tested until encountering the last flag that is not set (thereby signifying that the pixel is a black or non-color pixel) and the N preceding pixels are examined to identify the actual last color pixel so as to indicate the end of the colored region. All Ka values are thereafter set to 0 for pixels between the first and last color pixel plus a margin (such as (N−1)/2) inclusive, and for each of the M raster lines centered on the current raster line. Then, for all non-color pixels (i.e., for all pixels in which the flag is not set) where Ka is not equal to Kc, which signifies that the pixel is a black pixel that should be printed with process rather than true black, CMY and Kc values are independently re-derived, based on the original Kc value for the black pixel, so as to convert the pixel to a process black color.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
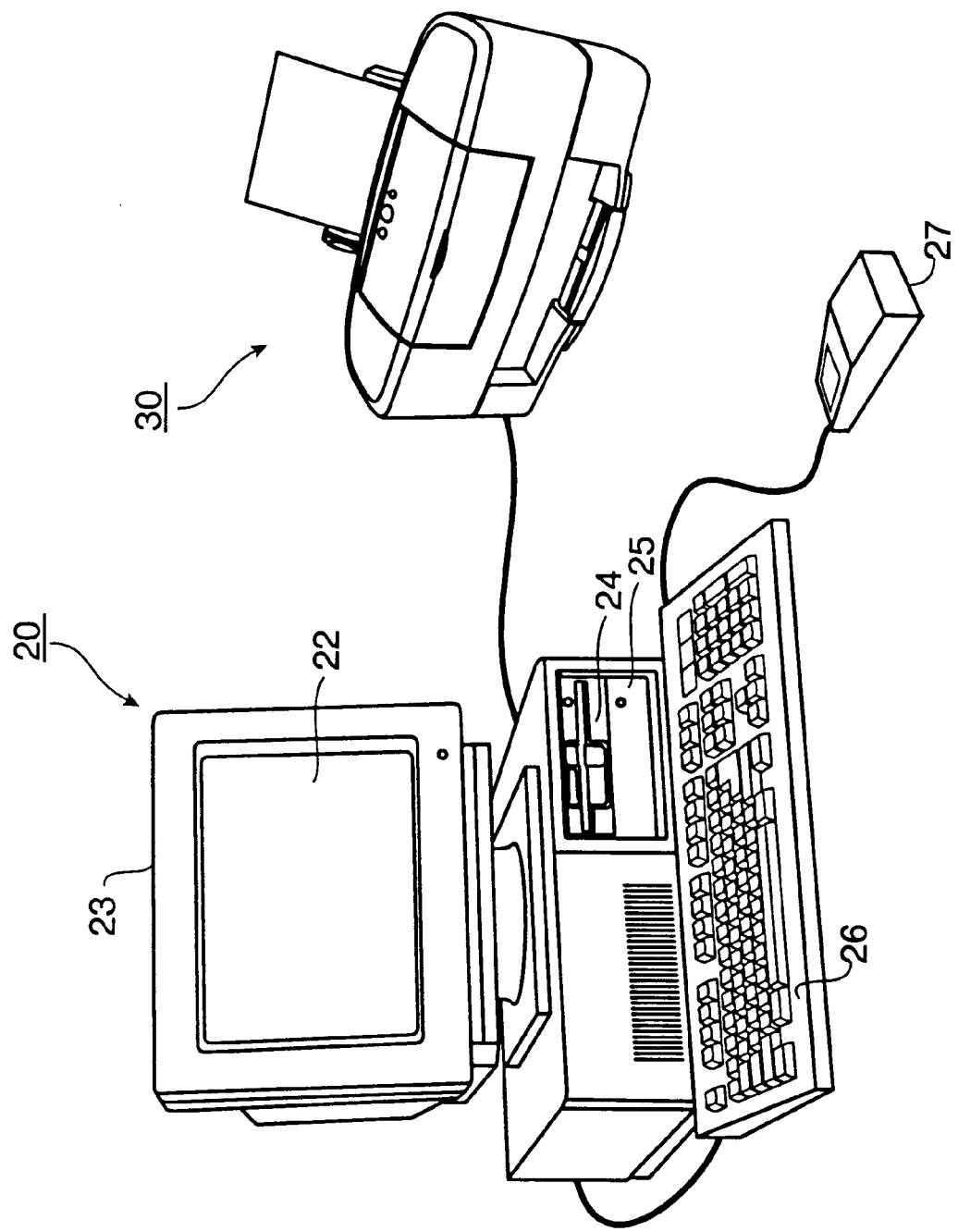
FIG. 1 shows a outward perspective view of computing equipment used in connection with the practice of the invention.

FIG. 1 is a view showing the outward appearance of computing equipment used in connection with the practice of the invention. Computing equipment 20 includes host processor 23. Host processor 23 comprises a personal computer (hereinafter "PC"), preferably an IBM PC-compatible computer having a windowing environment, such as MicroSoft Windows 95. Provided with computing equipment 20 are display screen 22 comprising a color monitor or the like, keyboard 26 for entering text data and user commands, and pointing device 27. Pointing device 27 preferably comprises a mouse for pointing and for manipulating objects displayed on display screen 22.

Computing equipment 20 includes a computer readable memory medium such as computer disk 25 and floppy disk drive 24. Floppy disk drive 24 provides a means whereby computing equipment 20 can access information, such as data, application programs, etc., stored on floppy disks. A similar CD-ROM interface (not shown) provided for computer equipment 20, through which computing equipment 20 can access information stored on CD ROM.

Disk 25 is one example of a computer readable medium that stores program instruction sequences executable by CPU 100 so as to constitute operating system 111, application programs 112, printer driver 114, and other application programs, files, and device drivers such as driver 119. Application programs are programs by which host processor 23 generates files, manipulates and stores those files on disk 25, presents data in those files to a user via display screen 22, and prints data via printer 30. Disk 25 also stores an operating system which, as noted above, is preferably a windowing operating system such as Windows 95. Device drivers are also stored on disk 25. At least one of the device drivers comprises a printer driver 114 which provides a software interface to printer 30. Data exchanged between host processor 23 and printer 30 is effected by the printer driver, as described in more detail below.

Printer 30 is preferably a color ink jet printer which forms images by ejecting droplets of ink onto a recording medium such as paper or transparencies or the like. One suitable printer is described in the aforementioned Application Ser. No. 08/972,308.

Figure 2:
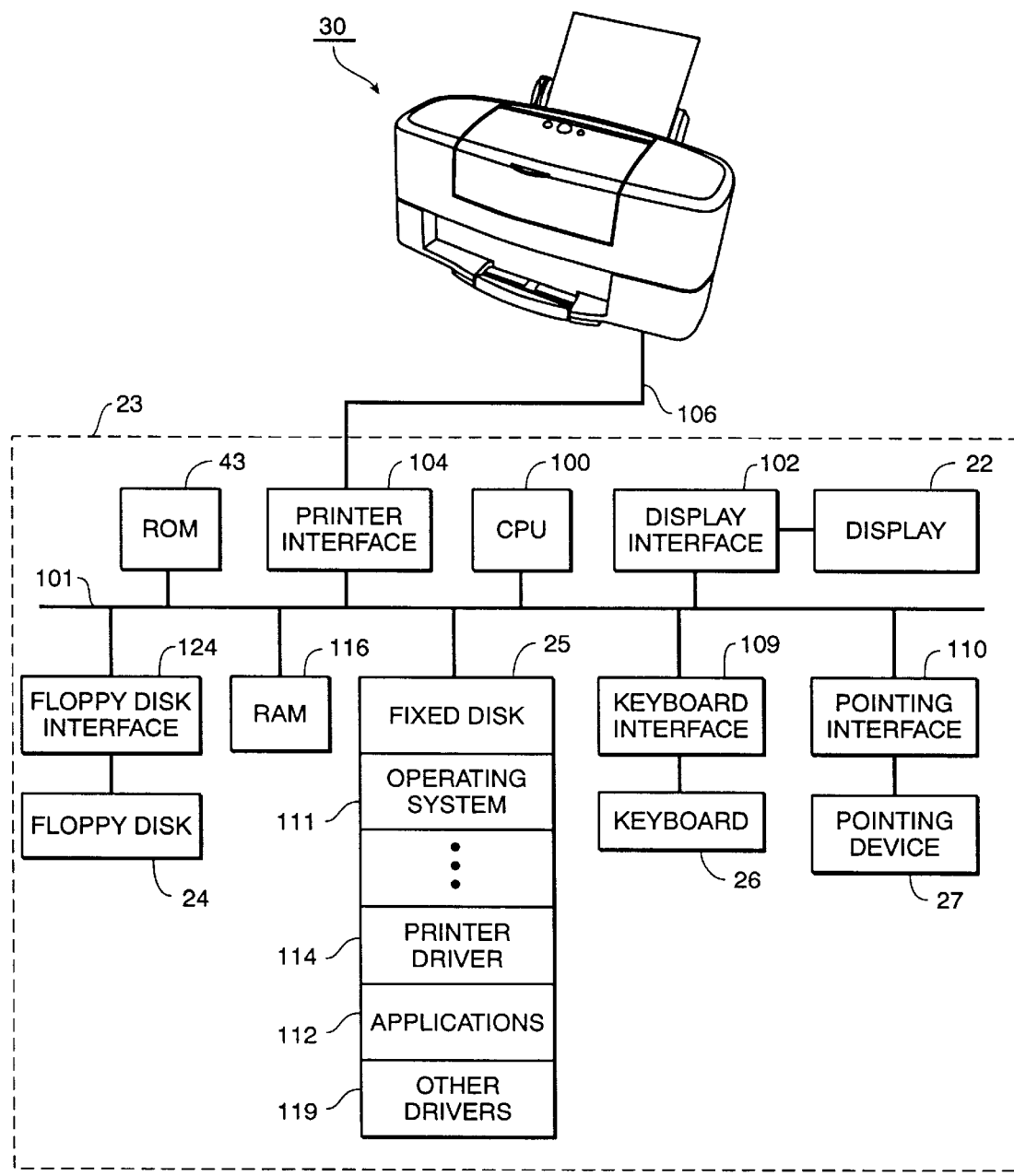
FIG. 2 is a detailed block diagram of the host processor shown in FIG. 1.

FIG. 2 is a block diagram showing the internal structures of host processor 23. In FIG. 2, host processor 23 includes a central processing unit 100 such as programmable microprocessor interfaced to computer bus 101. Also coupled to computer bus 101 are display interface 102 for interfacing to display 22, printer interface 104 for interfacing to printer 30 through a bi-directional communication line 106, floppy disk interface 124 for interfacing to floppy disk drive 24, keyboard interface 109 for interfacing to keyboard 26, and pointing device interface 110 for interfacing to pointing device 27.

A random access main memory (hereinafter "RAM") 116 interfaces to computer bus 101 to provide CPU 100 with access to memory storage. In particular, when executing stored program instruction sequences such as those associated with printer driver 114, CPU 100 loads those instruction sequences from disk 25 (or other storage media such as computer-readable media accessed via a network interface) into RAM 116 and executes those stored program instruction sequences out of RAM 116. It should also be recognized that standard disk-swapping techniques available under windowing operating systems allow segments of memory to be swapped on and off disk 25 to RAM 116.

Read only memory (hereinafter "ROM") 43 in host processor 23 stores invariant instruction sequences, such as start-up instruction sequences or basic input/output operating system (BIOS) sequences for operation of keyboard 26.

Disk 25 may also store color image files such as might be displayed by display 22 or printed by printer 30 under control of specific application programs. Such color image files, which might also be generated dynamically during the execution of application programs, store or encode color image data for each pixel of a color image. One popular storage or encoding format is storage of a red, green and blue (RGB) color primary value for each pixel of the color image, with each of the R, G and B components being represented by an 8-bit byte. A resulting color image stored or encoded in this format provides the ability to represent each pixel of a color image by any one of $2^8 \times 2^8 \times 2^8 = 16.7$ million different colors. Such a format is sometimes called "true color" or "24-bit color".

One function of print driver 114 is to convert a 24-bit true color image into printer output data, and to transmit the printer output data over bi-directional interface 106 to printer 30 or printout thereby. It is during conversion of such multi-level input data to printer output data that process black replacement according to this embodiment of the invention occurs.

Figure 3:
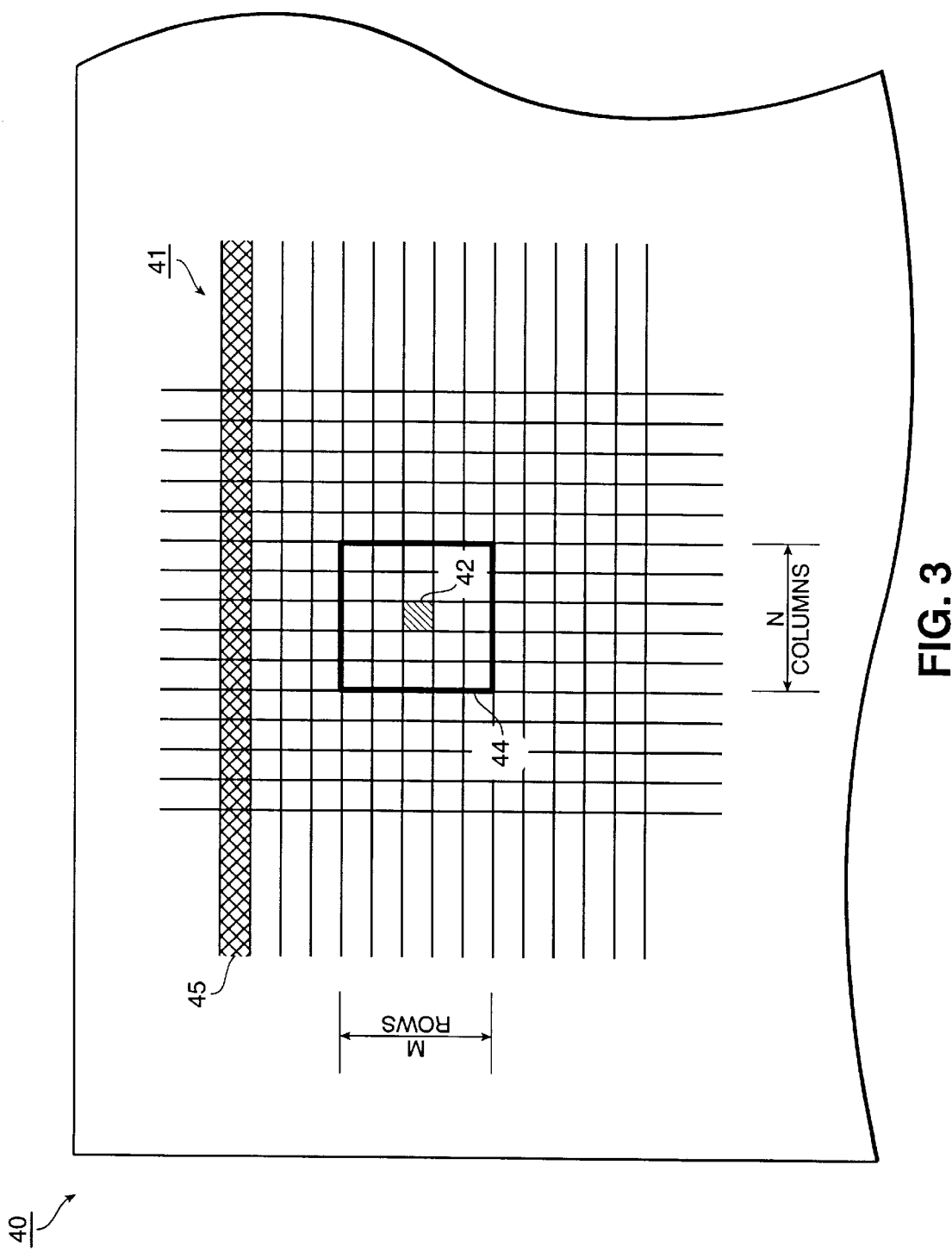
FIG. 3 is view for explaining a current raster line and for explaining process black replacement within an M row by N column grid of pixels.

FIG. 3 illustrates the objective of process black replacement. Shown in FIG. 3 is a representative document image 40 comprised of a rectangular grid of pixels 41, with image data associated with each pixel. For every target pixel 42 within image 40, a rectangular grid 44 of M rows by N columns is defined. Preferably, the grid is 5×5. If target pixel 42 is a colored pixel, meaning that the multi-level image data for target 42 has color components other than a pure gray (including black and white) component, then any black pixels within grid 44 should be replaced with process black, so as to avoid bleeding between such black pixels and target pixel 42. Such processing is repeated for each and every target pixel 42 within image 40.

Figure 4:
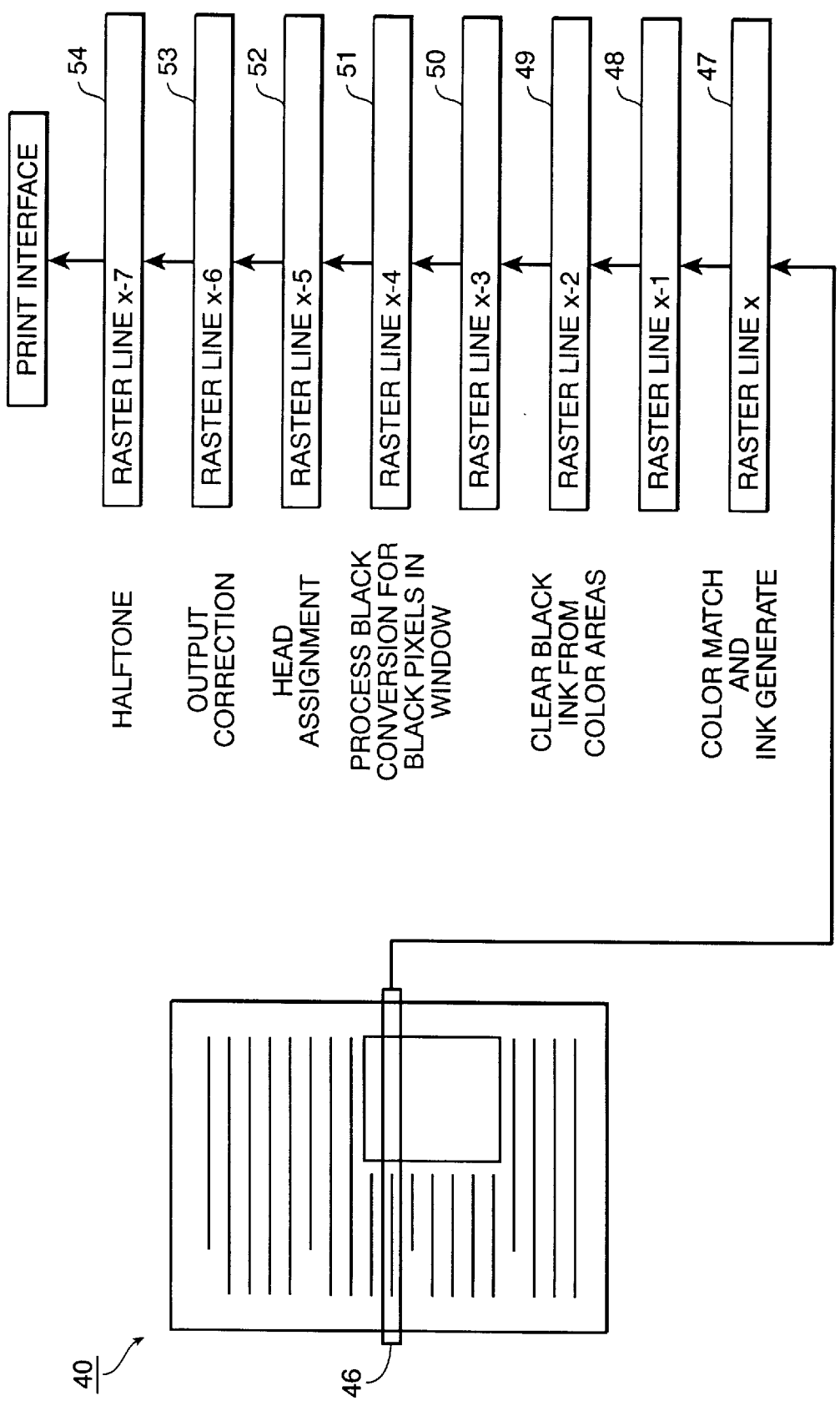
FIG. 4 illustrates pipeline processing of successive raster lines of image data by a printer driver according to the invention.

FIG. 4 illustrates how printer driver 114 processes each successive raster line of print data. FIG. 4 shows representative image data 40 composed of multiple successive raster lines (or rows of pixels; see 45 in FIG. 3). Print driver 114 processes each successive raster line such that up to eight successive raster lines, in various stages of processing, might reside in memory at the same time. The processing involves conversion from RGB multilevel data through to output of CMYK halftoned printer data to printer 30. One representative raster line 46 enters the eight-stage pipeline processing at first stage 47. At first stage 47, color match processing is effected on the raster line so as to convert multilevel RGB data into multilevel CMYK data, with the conversion being tailored so as to accommodate any desired color match, such as a color match between a printer and a monitor or a scanner and a monitor, as well as undercolor removal. The output of color match processing is an 8-bit byte for each of the C, M, Y and K color components, for each pixel in the raster line, in correspondence to the RGB input data. Three additional 8-bit bytes are also calculated in first stage 47. First, an 8-bit color flag Pc is derived based on whether the C, M, and Y components indicate that the pixel is colored or non-colored (i.e., is black or white or some shade of pure gray). Pc is set (such as by setting the PC byte to FFh), or not set (such as by setting the Pc byte to OOh) as follows:

Pc is not set if c=m=y=0 (i.e., a non-color black or gray or white pixel)

Pc is set otherwise (i.e., a colored pixel).

The second and third bytes derived for each pixel at stage 47 are a Ka byte and a Kc byte. Ka and Kc are set as follows:

Ka=Kc=K if Pc=0 (i.e., for a non-color(white or gray or black) pixel)

Ka=0]

Kc=K] if Pc=1 (i.e., a color pixel).

Ka and Kc are used to signify whether a pixel is printed with process black or with black ink. Specifically, Ka indicates the pixel is an unrestricted pixel that may be printed with black ink if desired. On the other hand, Kc signifies that the pixel must be printed with process black. The use of Ka and Kc is described in more detail below, in connection with FIG. 7.

Finally, in first stage 47, the raster line is subjected to ink generation processing, whereby color primaries for each of the seven primary colors (i.e., red, green, blue, cyan, magenta, yellow and black) are generated for each pixel. The color primaries so generated are used in subsequent print driver operations so as to obtain desirable ink ejection characteristics at each pixel.

After processing in first stage 47, the raster line advances to a second stage 48, which merely holds the raster data without any processing other than that due to replacement by process black caused by processing of a preceding raster line.

At third stage 49, the raster is subjected to process black processing so as to clear black ink from all colored regions. Process black processing at third stage 49 involves identification of colored windows in which black ink should be replaced by process black, as well as clearing black ink therefor in surrounding rasters, as described in more detail in connection with FIG. 5.

After process black processing in third stage 49, the raster line advances to fourth stage 50, which merely holds the raster data without any processing other than that due to replacement by process black caused by processing of a preceding raster line.

At fifth stage 51, the raster line is subjected to process black conversion for black pixels in the colored regions identified during previous process black processings. Such process black conversions are described in more detail in connection with FIG. 7.

Processing at sixth stage 52 includes processing to assign each pixel for printout by one particular nozzle of one of the multiple print heads of printer 30.

At seventh stage 53, the raster line is subjected to output correction processing. Output correction processing compensates for differing output characteristics of each of the print heads in printer 30, such as by compensating for dual print head printing, ink density characteristics, optical density characteristics, ink droplet limitations and the like.

After output correction processing in seventh stage 53, the raster line is subjected to halftone processing in eighth stage 54, so as to generate printer data. The halftoned processed printer data for the raster line is then transmitted to printer 30 over bi-directional interface 106.

Figure 5:
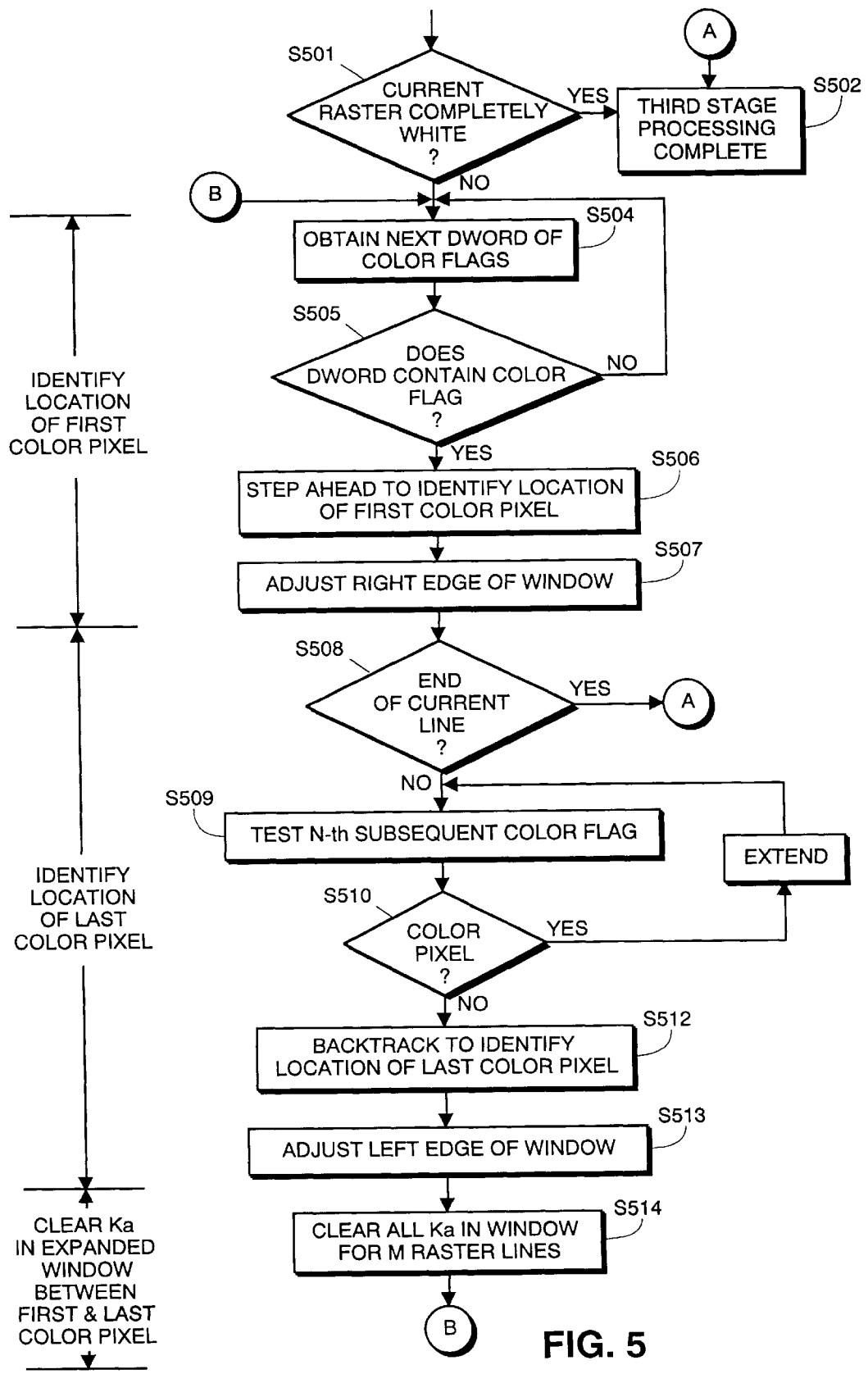
FIG. 5 is a flow diagram illustrating process steps for identifying first and last color pixels in a raster line, and for clearing true black from an expanded window marked by the first and last color pixels.

FIG. 5 is a flow diagram illustrating computer-executable stored program instruction sequences constituting process black processing according to one aspect of the invention. The process steps shown in FIG. 5 are preferably stored in printer driver 114 on disk 25, and are executed by CPU 100 so as to identify and to flag colored regions (or windows) in raster image data for which black pixels should be replaced by process black. Although the stored program instruction sequences are preferably executed by host processor 23, there may be some circumstances in which these process steps can be executed by an unshown CPU in printer 30. In such circumstances, the stored program instruction sequences are preferably stored in an unshown program ROM in printer 30, and are executed by printer 30 so as to effect process black replacement.

Generally speaking, the process steps shown in FIG. 5 operate to identify and flag all colored regions in each raster line by first identifying a starting location of the region and then identifying an ending location of the region. (The process is repeated to identify each region in the raster line.) The starting location is preferably obtained by accessing the color flag Pc in groups of four, so as to allow double word processing in CPU 100, thereby effectively speeding the identification of the starting location by a factor of approximately four. To determine the ending location, the color flag Pc is inspected for only every Nth pixel and not for each and every pixel. Since only every Nth pixel is inspected, identifying the location of the last colored pixel in a process black region is speeded by a factor of approximately N.

In the embodiment described for FIG. 5, processing of each raster line proceeds from right to left, and this direction is preferred. The reason why right-to-left processing is preferred is as follows. As processing of each raster line is drawing to an end, testing of bytes will likely extend beyond the end of the raster line (because byte testing either proceeds in groups of four or skips N pixels). Processing from right-to-left allows the extension of byte testing to occur in a raster underflow region of memory, rather than a raster overflow region. Generally speaking, it is easier programmatically to accommodate underflow regions rather than to accommodate overflow regions. In addition, the underflow region can be pre-loaded with bytes having recognizable patterns so as to assist in testing for colored regions. For example, the underflow region can consist of consecutive bytes of Pc flags which are all 00h so as to indicate a black/non colored pixel, with the exception of the Nth Pc flag which is set to FFh so as to indicate a colored pixel. The number of bytes in the underflow region is at least large enough to accommodate testing by DWORD and skipping of N bytes; where N=5 the number of bytes in the underflow region is conveniently set at 8, with four consecutive bytes of 00h, followed by one byte (i.e., the fifth byte) of FFh, and with the remaining bytes being 00h.

In more detail, third stage processing 49 commences with a determination in step S501 of whether the current raster line is completely white, meaning that C=M=Y=K=0 for each and every pixel in the line. If the entire raster line is completely white, then no processing whatsoever need be performed and flow proceeds to whatever processing might be needed for the raster line in the fourth and subsequent stages.

On the other hand, if the current raster line is not completely white, then flow advances to step S504 to determine the starting location of a first colored region by obtaining the next double word of color flags Pc. Specifically, to determine the starting location of a colored region, color flags Pc are not accessed individually, but rather are accessed in double word groups of four. Since double word operations on microprocessors such as a Pentium require the same or approximately the same number of clock cycles as byte processing, double word accessing of the Pc flags in step S504 effectively speeds identification of the starting location of a colored region by a factor of about four.

Step S505 determines whether the double word of Pc flags indicates that at least one pixel in the double word is a color pixel. If the double word does not indicate that at least one pixel is a color pixel, then flow returns to step S504 to obtain the next double word of color flags Pc.

On the other hand, if the double word of color flags Pc indicates that one pixel in the double word contains color, then flow advances to step S506 which steps ahead so as to identify the exact location of the first color pixel. This operation is depicted in more detail in connection with FIG. 6.

Figure 6:
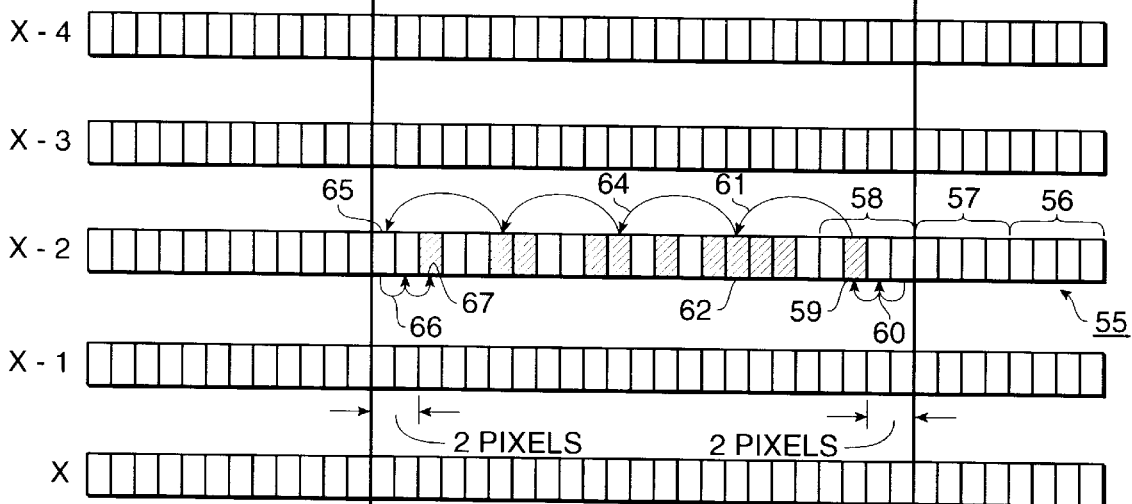
FIG. 6 is a view for explaining the process steps of FIG. 5.
Figure 6:
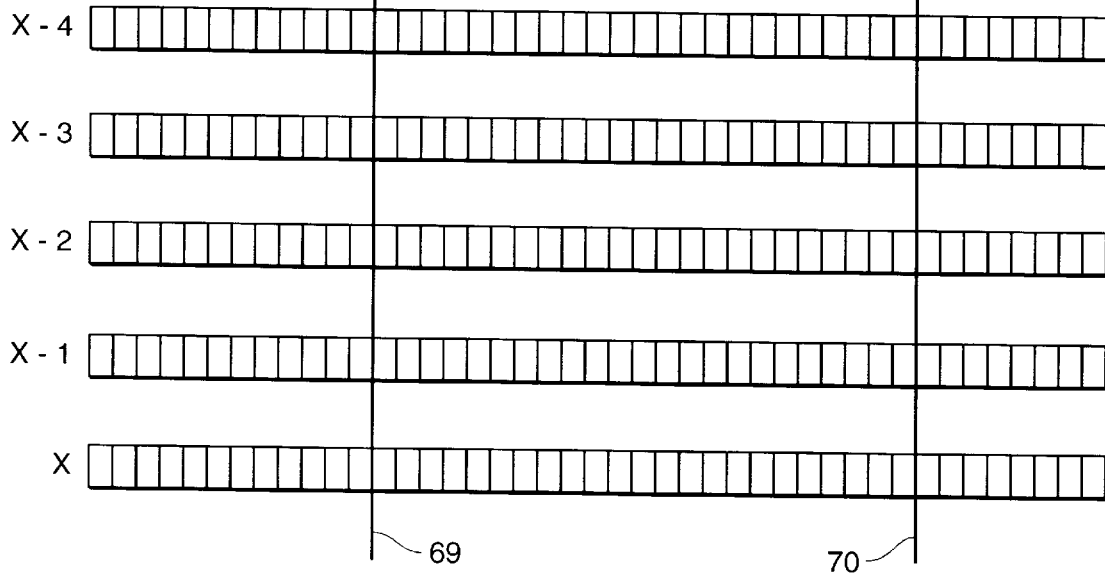

FIG. 6 depicts the color flags Pc for each of five raster lines, ranging from line x through x–4. Because of pipeline processing in print driver 114, and as explained previously in connection with FIG. 4, the current raster line being processed by FIG. 5 is line x–2, designated with reference number 55. Pixels in which the color flag is set, indicating a colored pixel, are indicated by cross hatching.

Double word processing in accordance with steps S504 and S505 has resulted in advancement from double word 56 to second double word 57, neither of which contain any colored pixels, to third double word 58 which contains one colored pixel 59. Step S505 determines that at least one pixel in double word 58 is colored, but does not identify the first colored pixel within the double word. It is the purpose of step S506 to identify the location of the first colored pixel within double word 58, by stepping ahead as indicated by arrows 60 until the first colored pixel 59 within double word 58 is located.

Reverting to FIG. 5, and with location of the first color pixel in a colored region for the current raster line identified at step S506, step S507 adjusts the right edge of the window within which process black replacement will occur, by expanding the window outwardly. Preferably, the window is expanded outwardly by (N–1)/2 pixels, or by 2 pixels when N=5, as shown at line 70 in FIG. 6.

Step S508 determines whether the end of the current raster has been reached. Specifically, and as mentioned above, FIG. 5 processing is repeated to identify each colored region in the current raster line. It is therefore possible that processing at steps S504 through S507 has exceeded the leftmost edge of the current raster line, into the raster underflow region. Step S508 detects this, and if the current raster line has been exceeded then flow branches to step S502 to signify completion of third stage processing for the current raster.

On the other hand, if the current raster line has not been exceeded, processing proceeds with steps S509 to 512 to determine the location of the last color pixel of the current colored region (in which black ink will be replaced by process black) in the raster line. Specifically, step S509 tests each Nth subsequent color flag in the current raster line. The reason why it is not necessary to test each and every subsequent color flag, and why it is sufficient to test each only Nth subsequent color flag, is that process black replacement will replace all black pixels with process black within a region of ±N/2 of any color pixel. Accordingly, it is only necessary to test each Nth pixel to determine if it is a color pixel since if a color pixel has already been found, and the next Nth pixel is also a color pixel, then it will be necessary in any event to convert all black pixels between such two pixels to process black.

Step S510 determines whether each Nth subsequent color flag indicates a color pixel. If a color pixel continues to be indicated, then processing returns to step S509, after extending the test to the next Nth subsequent color flag, until the color flag Pc signifies that a non-color pixel (i.e., black or white or gray) has been located. This processing is illustrated in more detail in connection with FIG. 6.

Specifically, as shown in FIG. 6, starting with pixel 59 N pixels are skipped (in this case N=5) to reach pixel 62, as indicated by arrow 61. Since color flag Pc for pixel 62 indicates that pixel 62 is a color pixel, a further group of N pixels are skipped as indicated at arrow 64. This process, which corresponds to steps S509 and S510, repeats until reaching pixel 65, whose color flag Pc indicates that pixel 65 is a non-color pixel.

Reverting to FIG. 5, since a non-color pixel has been found, flow advances to step S512 which backtracks to identify the location of the last color pixel for the current colored region. Specifically, since N pixels have been skipped to reach a non-color pixel, and since it is desired to obtain the location of the last color pixel in the current window, step S512 backtracks until it obtains a pixel whose color flag Pc signifies a color pixel. Processing of step S511 is signified by arrows 66 of FIG. 6, which backtrack until reaching pixel 67 whose color flag Pc signifies a color pixel. Flow thereafter advances to step S513.

Step S513 adjusts the left edge of the window boundary identified above in steps S509 through S512, with the amount that the window is expanded being set to approximately (N–1)/2 when N is an odd number. That is, since it is desired to set all black pixels within an M×N grid of pixels surrounding a color pixel, step S513 expands the window of the last location of color pixels by this appropriate amount. In the current example, where N=5, the window is expanded by two pixels as indicated by line 69 of FIG. 6.

Step S514 then clears all values of Ka within the window, for each of the M raster lines centered on the current raster line, thereby clearing black ink for all color areas within the window in these M raster lines. For microprocessors such as a Pentium, clearing values of Ka (which is equivalent to setting values of Ka=0) can be performed most expeditiously by using block clears of 32 bits each. Thus, it is preferred that for all pixels aligned at a double word boundary, block clears are used to clear Ka values within the window identified at step S512, with remaining Ka's not falling on a double word boundary being cleared individually.

Flow then returns to step S504 so as to identify the first and last location of colored pixels in the next colored region for which black ink clearing is needed.

Figure 7:
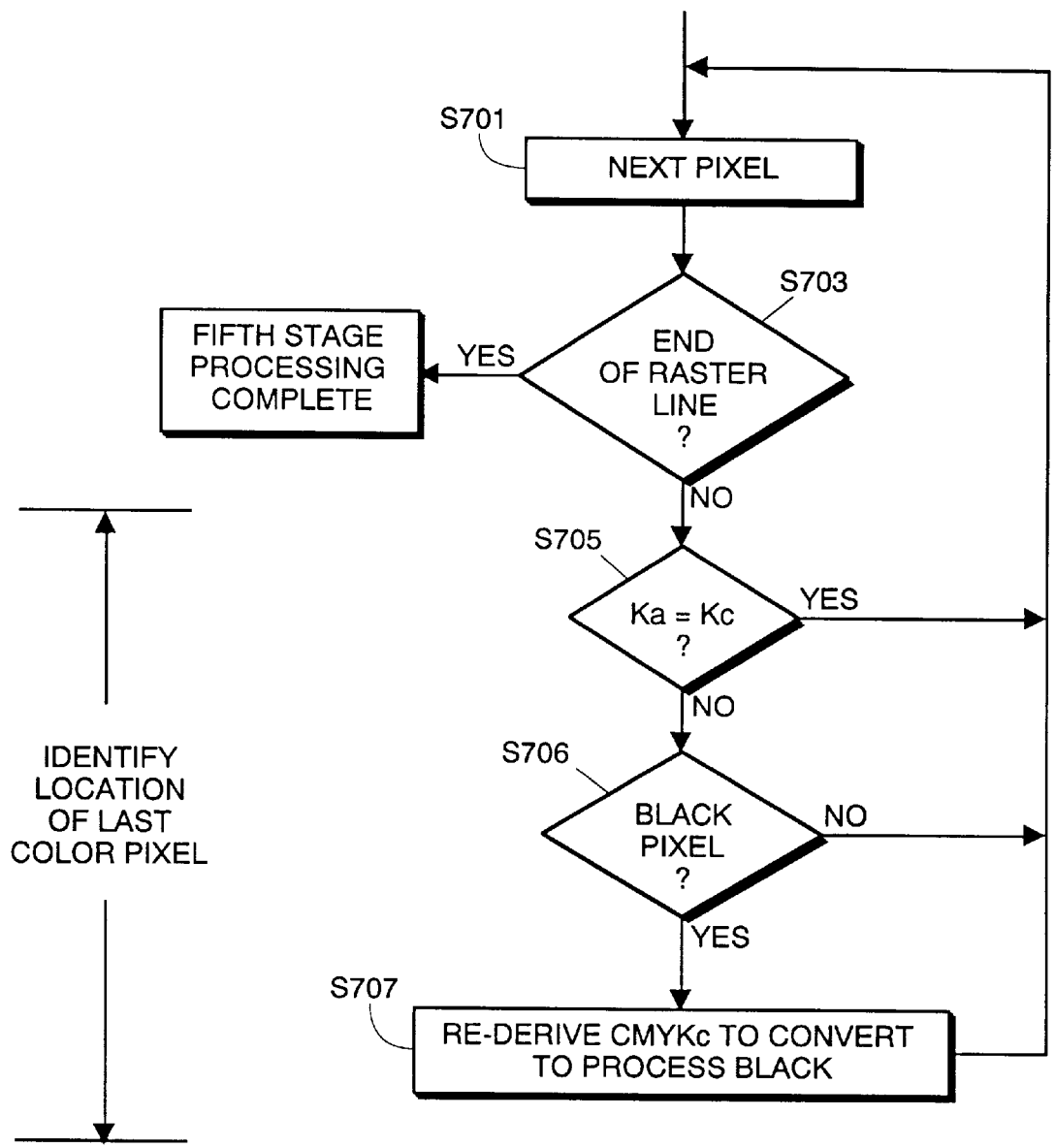
FIG. 7 is a flow diagram for explaining re-derivation of image data for black pixels that are replaced with process black.

FIG. 7 is a flow diagram illustrating process steps performed by printer driver 114 in fifth stage processing 51. The process steps shown in FIG. 7 operate generally to convert black to process black in all colored regions identified as needing such replacement. The technique used in FIG. 7 to determine which regions need replacement by process black is an inspection of the Ka and Kc values for all black pixels. Specifically, in first stage processing 47, printer driver 114 set Ka=Kc for all black pixels. On the other hand, during process black processing in third stage 49, printer driver 114 performed block clears for all Ka's in windows for which process black replacement was desired. Accordingly, in the fifth stage processing 51 shown in FIG. 7, printer driver 114 performs process black replacement for all black pixels in which Ka no longer equals Kc.

In more detail, step S701 obtains the next pixel x–4 in the raster line. So long as an end of the raster line has not been reached (step S703), printer driver 114 compares Ka to Kc. Preferably, the comparison of Ka to Kc proceeds by double word compares, so as to speed the comparison process. In the event that Ka=Kc, flow returns to step S701 to process the next pixel. On the other hand, if Ka is not equal to Kc, then step S706 determines whether the pixel is a black pixel by reference to color flag Pc. If the pixel is a color pixel, then no further processing is performed, and flow returns to step S701 for processing of the next pixel. On the other hand, if step S706 determines that the pixel is a non-color pixel, then since Ka is not equal to Kc, then process black replacement is needed for the pixel. Accordingly, flow advances to step S707 in which C, M, Y and Kc values are re-derived for the pixel. The C, M, Y and Kc values are re-derived so as to obtain process black replacement for pixels within the boundaries of black/color interface region.

Since image data for a pixel needing process black replacement has not yet been halftoned, such image data is still multi-level. Accordingly, one suitable process for re-deriving the C, M, Y and Kc values for a pixel needing process black replacement is through use of look-up tables which are accessed based on the current black value. The following equations may be used:

$$C_{Rederived} = Ck \ (KC)$$

$$M_{Rederived} = Mk \ (KC)$$

$$Y_{Rederived} = Yk \ (KC)$$

$$KC_{rederived} = Kk \ (KC)$$

where Ck, Mk, Yk and Kk are functions implemented as look-up tables.

As a result of processing according to FIG. 7, colored regions identified as needing process black replacement at third stage processing 49 are subjected to process black replacement in fifth stage processing 51.

In the foregoing, it was assumed that the values of M and N were the same. However, M and N can be varied, if desired, and in particular can be different numbers.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A print driver in which image data for black pixels is replaced with process black for all pixels in each M row by N column region surrounding a target pixel in the event that the target pixel is a color pixel, comprising:

a first identifying step of identifying location of the first color pixel in a current replacement window of a current raster line, said first identification step testing multiple pixels simultaneously in groups so as to determine whether a group contains a color pixel;

a second identifying step of identifying location of the last color pixel in the current replacement window of the current raster line, said second identifying step testing each Nth subsequent pixel to the first color pixel until encountering a pixel that is not color; and replacing image data for black pixels with image data for process black for all pixels between the first and last color pixel plus a margin, for each of M raster lines centered on the current raster line.

2. A print driver according to claim 1, wherein the image data is comprised by 8-bit bytes and wherein said first identification step proceeds by testing double words.

3. A print driver according to claim 1, wherein said replacing step comprises the step of re-deriving image data so as to convert to process black.

4. A print driver according to claim 3, wherein said step of re-deriving comprises look-up in a look-up table.

5. A print driver according to claim 1, wherein said first identification step includes the step of identifying the first color pixel within the group.

6. A print driver according to claim 1, wherein said first identification step includes the step of backtracking to identify the location of the last color pixel.

7. A method for outputting CMYKa and KC values based on input RGB values, in which true black is replaced with process black for all pixels in each M by N column N region surrounding a target pixel in the event that the target pixel is a color pixel comprising:

receiving three bytes for each pixel in a current raster line, the three bytes respectively representing R G and B multi-level values for the pixel;

converting the three RGB bytes to 32-bit CMYK for each pixel;

deriving a Ka byte and a Kc byte for each pixel, where Kc=K for a color pixel in which C, M and Y are not all zero, where Ka=Kc=K for a black pixel in which C, M and Y are all zero, and where Ka=Kc=0 for a white pixel in which all of CMY and K are zero;

deriving a Pc byte flag for each pixel in which Pc is set for a color pixel and is not set for a black or white pixel;

DWORD testing of the Pc flags in a raster line until encountering a DWORD that contains a Pc flag indicative of a color pixel within the DWORD, and thereafter identifying the first color pixel within the DWORD;

testing each Nth subsequent Pc flag until encountering the last Pc indicative of a black pixel, and thereafter identifying the last color pixel set;

setting Ka to zero for all pixels between the first and last color pixel plus a margin, inclusive, for each of M raster lines centered on the current raster line;

for all pixels in the current raster line where Ka is not equal to Kc, then if Pc is not set re-deriving CMYKc values so as to convert to process black.

8. A method according to claim 7, wherein said step of setting Ka to zero is comprised by double word block clears for all double word-aligned values of Ka, and individual clears for all Ka not double word-aligned.

9. A method according to claim 7, further comprising the step of determining whether Ka is not equal to Kc by double word testing of four bytes of Ka against four bytes of Kc.

\* \* \* \* \*

UNITED STATES PATENT AND TRADEMARK OFFICE
CERTIFICATE OF CORRECTION

PATENT NO.   : 6,118,548
DATED        : September 12, 2000
INVENTOR(S)  : Dennis I. Ryan Page 1 of 1

It is certified that error appears in the above-identified patent and that said Letters Patent is hereby corrected as shown below:

Column 2,
Line 43, "contains" should read -- that contains --.

Column 3,
Line 65, "provided" should read -- is provided --.

Column 5,
Line 39, "PC" should read -- Pc --.
Lines 50 and 51, "$\left. \begin{matrix} Ka = 0 ] \\ Kc = K ] \end{matrix} \right.$" should read -- $\left. \begin{matrix} Ka = 0 \\ Kc = K \end{matrix} \right]$ --.

Signed and Sealed this

Ninth Day of October, 2001

*Attest:*

NICHOLAS P. GODICI
*Attesting Officer*   *Acting Director of the United States Patent and Trademark Office*